United States Patent
Matthews

(10) Patent No.: US 10,139,234 B2
(45) Date of Patent: Nov. 27, 2018

(54) PATH PLANNING BASED ON OBSTRUCTION MAPPING

(71) Applicant: AGCO Corporation, Hesston, KS (US)

(72) Inventor: Paul Ross Matthews, Dietmannsried (DE)

(73) Assignee: AGCO Corporation, Duluth, GA (US)

( * ) Notice: Subject to any disclaimer, the term of this patent is extended or adjusted under 35 U.S.C. 154(b) by 57 days.

(21) Appl. No.: 15/053,320

(22) Filed: Feb. 25, 2016

(65) Prior Publication Data

US 2016/0258759 A1  Sep. 8, 2016

Related U.S. Application Data

(60) Provisional application No. 62/127,938, filed on Mar. 4, 2015.

(51) Int. Cl.

| G01C 21/20 | (2006.01) |
|---|---|
| A01B 79/00 | (2006.01) |
| G01S 19/14 | (2010.01) |
| G05D 1/02 | (2006.01) |
| G01S 19/39 | (2010.01) |
| G01S 19/42 | (2010.01) |

(52) U.S. Cl.
CPC ........... *G01C 21/20* (2013.01); *A01B 79/005* (2013.01); *G01S 19/14* (2013.01); *G01S 19/39* (2013.01); *G01S 19/42* (2013.01); *G05D 1/0212* (2013.01); *G05D 1/0274* (2013.01); *G05D 1/0278* (2013.01)

(58) Field of Classification Search
None
See application file for complete search history.

(56) References Cited

U.S. PATENT DOCUMENTS

2012/0059578 A1  3/2012  Venkatraman

FOREIGN PATENT DOCUMENTS

| JP | H0962353 A | 3/1997 |
| JP | 2007240322 A | 9/2007 |
| JP | 2009042106 A | 2/2009 |

OTHER PUBLICATIONS

European Patent Office, International Search Report for related European Patent Application No. EP16157132, dated Aug. 2, 2016.

*Primary Examiner* — Mussa A Shaawat
*Assistant Examiner* — Abdhesh K Jha

(57) ABSTRACT

In one embodiment, a method comprising, receiving a three-dimensional map of one or more obstructions associated with a field, the one or more obstructions presenting an obstacle to line of sight reception from a satellite to a global navigation satellite systems (GNSS) receiver; receiving almanac data corresponding to an orbit of the satellite; determining anticipated accuracy of positioning in the field at plural locations and plural times based on the almanac data and the map; and determining waylines for autonomous traversal through the field based on the anticipated accuracy at the plural locations and the plural times.

18 Claims, 16 Drawing Sheets

PATH PLANNING BASED ON OBSTRUCTION MAPPING

CROSS REFERENCE TO RELATED APPLICATION

This application claims the benefit of U.S. Provisional Application No. 62/127,938 filed Mar. 4, 2015, which is hereby incorporated by reference in its entirety.

TECHNICAL FIELD

The present disclosure is generally related to agriculture technology, and, more particularly, precision farming.

BACKGROUND

Guidance systems have become commonplace in precision agriculture (as well as other industries) over the last decade. During this period, a number of accuracy options have become available to Global Navigation Satellite Systems (GNSS)-based systems ranging from sub-meter to centimeter level accuracies. Operators expect improved performance out of such systems, but they are still subject to local effects on the system. Such effects include proximity to obstructions, such as a row of trees, which may inhibit the view of satellites and in turn reduce the performance that the system is capable of achieving. As a result, customers (whom pay a premium for improved accuracy systems) may become dissatisfied when the system does not provide sufficient or expected accuracy, and in some cases, to the extent that even auto-steer functionality may become inoperable.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Overview

Figure 1:
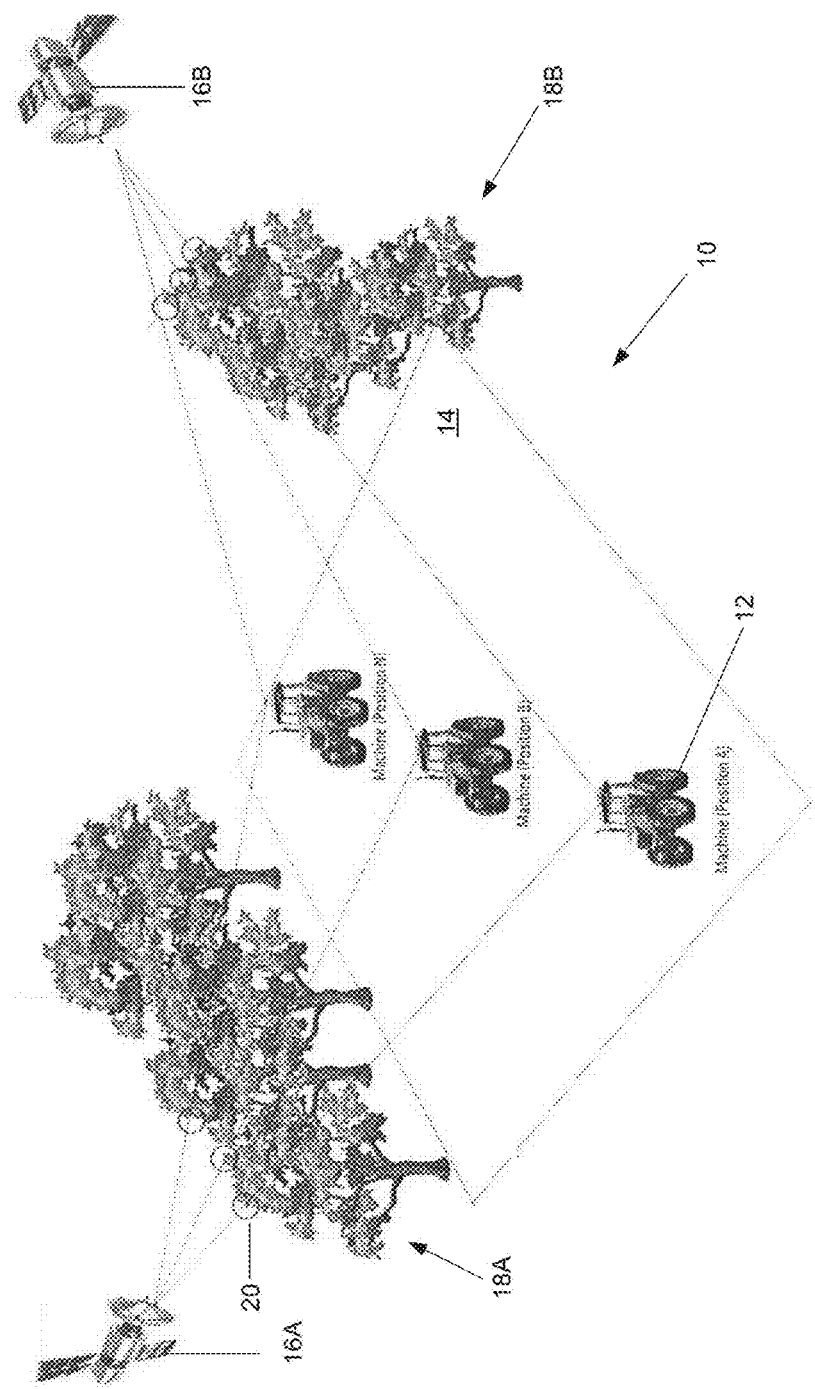
FIG. 1 is a schematic diagram that illustrates an example environment in which an embodiment of an example path planning system may be implemented.

In one embodiment, a method comprising, receiving a three-dimensional map of one or more obstructions associated with a field, the one or more obstructions presenting an obstacle to line of sight reception from a satellite to a global navigation satellite systems (GNSS) receiver; receiving almanac data corresponding to an orbit of the satellite; determining anticipated accuracy of positioning in the field at plural locations and plural times based on the almanac data and the map; and receiving a map of one or more obstructions associated with a field, the one or more obstructions presenting an obstacle to line of sight reception from a satellite to a global navigation satellite systems (GNSS) receiver; receiving almanac data corresponding to an orbit of the satellite; determining anticipated accuracy of positioning in the field at plural locations and plural times based on the almanac data and the map; and determining waylines for autonomous traversal through the field based on the anticipated accuracy at the plural locations and the plural times.

DETAILED DESCRIPTION

Certain embodiments of path planning systems and methods are disclosed that determine waylines that minimize the amount of time a positioning system is not operating at a desired level of performance. In one embodiment, the path planning system uses prior knowledge of obstructions to satellite reception associated with traversing a field and the dynamic nature of satellites to determine when and how to traverse the field to minimize signal reception loss, thus improving the overall accuracy of an on-board positioning system and precision of auto-guidance throughout traversal of the field. In general, over the course of one or more passes of the field, the path planning system records satellite data during such traversals to map an obstruction or obstructions in, around, and/or of the field. For instance, the path planning system monitors for changes in the tracking of satellites by a Global Navigation Satellite Systems (GNSS) receiver. Such changes may result from a loss (e.g., complete or substantial) of satellite reception in the line of sight due to an obstruction, or a gain in satellite signals as a result of a newly tracked satellite that has just come into view. The path planning system uses the satellite data recorded proximally in time to the satellite tracking change (e.g., the last recorded data for loss of signals or data recorded at the time a satellite comes into view) to compute information used to generate a three-dimensional (3D) obstruction map. The computed information includes the azimuth and elevation of one or more satellites and a coordinate position (e.g., longitude, latitude, altitude) of a machine that hosts the GNSS receiver. Through well-known triangulation techniques (using the computed information and the cutoff angle), the path planning system determines the size and location of one or more obstructions, generating the 3D obstruction map accordingly. The obstructions may include one or more of a variety of vegetation (e.g., trees) in or around the field, and/or other obstructions that are natural (e.g., hills or valleys, rock formations) or man-made (e.g., other machines, buildings, etc.). With sufficient data, the path planning system can model obstructions along an entire perimeter of the field as well as in-field or inherent terrain obstructions. The path planning system uses the obstruction map and an almanac (e.g., satellite data pertaining to satellite orbits) to build accuracy maps. The accuracy maps provide an indication of the anticipated accuracies that the positioning system is able to achieve at a given location at any given point in time for all or a portion of the entire field. As the satellite constellation (e.g., satellite geometry) changes, what may be a poor accuracy point at time A may be a better accuracy point at time B. In one embodiment, the path planning system determines the accuracy maps by calculating a dilution of precision or DOP (e.g., geometric DOP or Horizontal DOP) for different locations throughout the field at different times. The path planning system then uses the accuracy maps to determine waylines that enable traversal of the field at an optimized position accuracy.

Digressing briefly, existing satellite-based guidance systems have generally reduced their susceptibility to occlusion (blockages, sometimes referred to as urban canyons in other environments) using two methods. For instance, with the addition of one or more GNSS constellations (e.g., GLONASS, Galileo, etc. in addition to GPS), the GNSS receivers track more satellites and reduce the amount of error in the position. Additionally, with improved inertial sensors and algorithms, dead reckoning systems are better able to coast through these periods. However, with both of these methods, the environments in which farmers operate still stress the system (e.g., positioning and/or guidance system), which may reduce the accuracy below what the customer desires. With the additional information of obstructions in, around, and/or of the field, the dynamic nature of the GNSS constellations, and picking the order of waylines (e.g., paths or rows) to traverse and/or even designing the wayline shapes or types, certain embodiments of path planning systems can reduce (or eliminate) the inaccuracies present in conventional systems.

Having summarized certain features of path planning systems of the present disclosure, reference will now be made in detail to the description of the disclosure as illustrated in the drawings. While the disclosure will be described in connection with these drawings, there is no intent to limit it to the embodiment or embodiments disclosed herein. For instance, in the description that follows, one focus is on the agricultural industry in general and, more particularly, agricultural machines that host a GNSS receiver and a guidance system (e.g., with auto-steer functionality). However, it should be appreciated that some embodiments of path planning systems may be used in other industries, and hence are contemplated to be within the scope of the disclosure. Also, though described primarily as integrated with a machine host, it should be appreciated that at least some of the functionality of some embodiments of path planning systems may be distributed between a remote computing device (e.g., external to the machine) and the machine. Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

FIG. 1 is a schematic diagram that illustrates an example environment 10 in which an embodiment of an example path planning systems may be implemented. It should be appreciated within the context of the present disclosure that the environment 10 is merely illustrative, and that other environments with different obstructions (e.g., man-made or natural) and/or machines may be involved and hence are contemplated to be within the scope of the disclosure. For instance, obstructions may also include in-field obstructions and/or obstructions inherent in the terrain, such as ridge lines, valleys, etc. The environment 10 is schematically depicted as an overlaid, time-lapse of a machine 12 as it traverses a field 14. The machine 12 is equipped with a path planning system. The machine 12 traverses the field 14 at positions A, B, through N. In one embodiment, the machine 12 is equipped with a positioning system that cooperates with a guidance system to enable autonomous or semi-autonomous traversal of the field 14. For instance, the positioning system may comprise a GNSS receiver, and the guidance system may provide auto-steer functionality based on waylines as is known to one having ordinary skill in the art. During traversal through positions A-N of the field 14, a positioning system of the machine 12 receives satellite data from plural satellites, such as satellites 16A and 16B. It should be appreciated that the quantity of satellites 16A, 16B depicted in FIG. 1 is merely illustrative, and that additional satellites are to be expected in practice. Outlining portions of the field perimeter are obstructions 18 (18A, 18B), depicted in this example as trees. The positioning system of the machine 12 receives satellite data from the satellites 16A, 16B, as shown by the line projections between the satellites 16A, 16B and the machine 12. Also noted is that the obstructions 18 (18A and 18B) present an obstacle to the reception of the satellite signals in the line of sight, such as shown by the minimum elevation at which the satellite can be tracked as denoted by the circles 20 at the top of the obstructions 18. That is, when the line of sight is such that it passes beneath the minimum elevation, a loss (complete or substantial loss) of signal reception may occur. The obstructions 18 may degrade the performance of the positioning system of the machine 12 in the absence of a path planning system.

Figure 2:
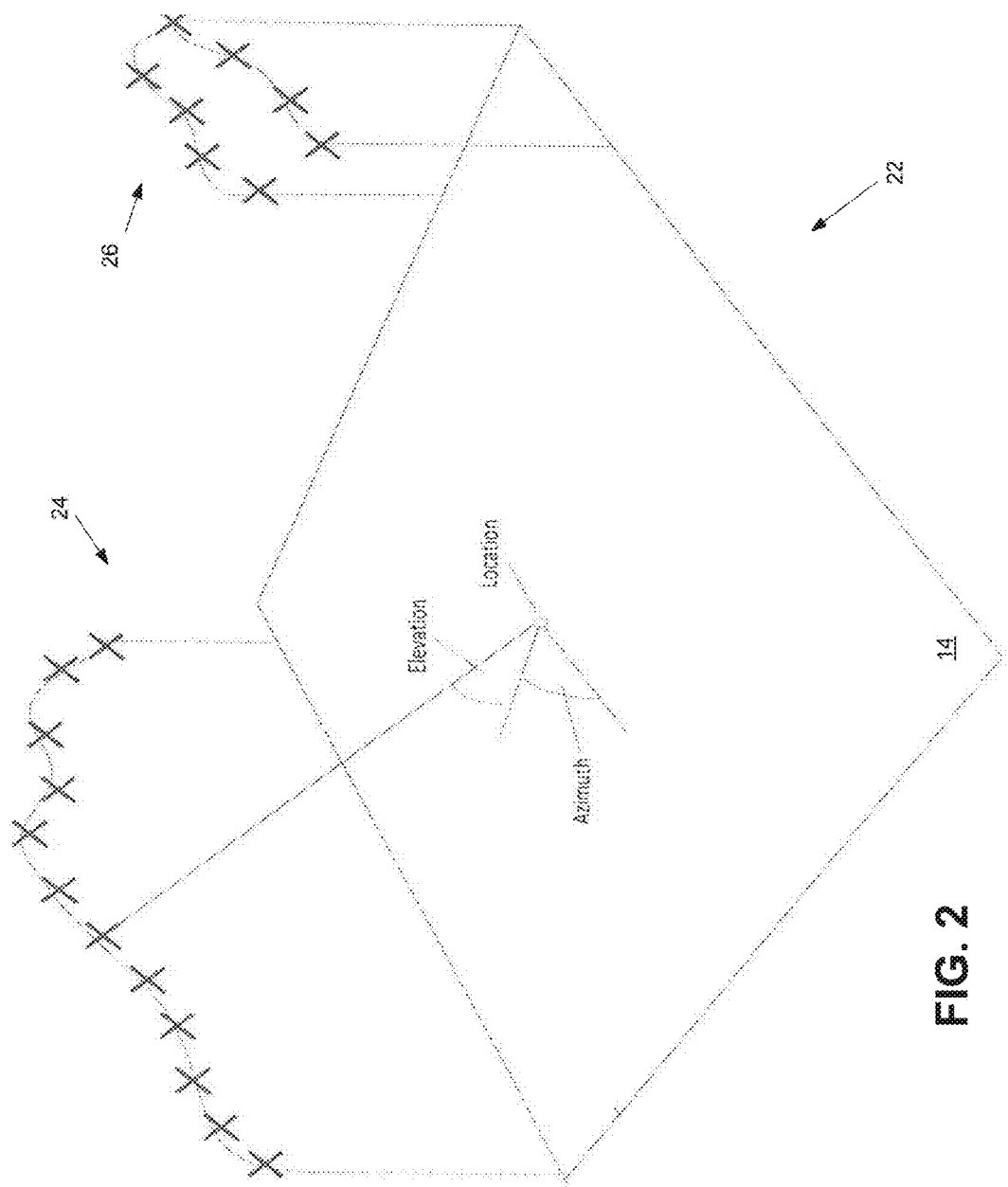
FIG. 2 is a schematic diagram that illustrates an example obstruction map that may be provided by an embodiment of an example path planning system based on detecting transitions in satellite tracking during traversal of the environment of FIG. 1.

Referring now to FIG. 2, shown is a schematic diagram depicting an example obstruction map 22 that may be provided (e.g., generated) by an embodiment of an example path planning system based on recording satellite data during traversal of the environment 10 of FIG. 1. In this example, the map 22 is a horizon map (e.g., map of obstructions 18 (FIG. 1) proximal to the border of the field 14). The map 22 comprises a set of data points 24 and 26 representing the obstructions 18A and 18B, respectively.

The representation may be a three-dimensional (3D) representation of the entirety (or partially, such as an outline) of the obstructions 18. The path planning system generates the map 22 based on satellite data gathered during one or more passes of the machine 12 (FIG. 1) across the field 14. In one embodiment, while the machine 12 (FIG. 1) traverses the field, the path planning system monitors for changes in satellite tracking (e.g., tracking by the GNSS receiver of the positioning system). For purposes of illustration, assume the GNSS receiver is tracking a plurality of satellites at time intervals of T, T+1 through T+15 (and so on, the times of tracking between T+1 and T+15 not shown for brevity). Table 1 provides an illustrative example of this satellite tracking:

TABLE 1

| Time (T) | Time (T + 1) | Time (T + 15) |
|----------|--------------|---------------|
| 3 | 3 | 3 |
| 15 | 17 | 17 |
| 17 | | 9 |

As is known, GNSS satellites of each constellation may be represented with unique numbers. For illustrative purposes, the values of 3, 15, 17, etc. are used in Table 1 to represent the respective satellites being tracked. The satellites detected at time equals T are 3, 15, and 17. At T+1, the satellites tracked are satellites 3 and 17. At T+15, the satellites tracked include satellites 3, 17, and 9. At time equals T+1, it is noted that one satellite is not listed (e.g., satellite 15) versus at time equals T. In other words, the signal from the satellite 17 has been lost (e.g., occluded by an obstruction), representing a satellite tracking transition. For instance, the loss may occur when the line of sight passes beneath the minimum elevations denoted by the circles 20 in FIG. 1. The path planning system detects this change in satellite tracking (e.g., due to the loss in satellite signal reception), and uses the recorded satellite data from time equals T to compute the azimuth and elevation of the satellite (satellite 15) and the machine position for time equals T. In other words, the loss of satellite signals from satellite 15 corresponds to a data point used for mapping, as described below. Continuing, at time equals T+15, it is noted that a satellite signal from satellite 5 is gained, and hence another data point results due to the change in satellite tracking. Note that the quantity of satellites is for simplicity, as there may be significantly more satellites to track in practice. The path planning system thus uses satellite data at a time corresponding to the detected change in tracking to compute the azimuth and elevation and machine position. For instance, for gaining a satellite from times T to T+1, the path planning system computes the azimuth and the elevation of the new satellite (and machine position) using satellite data recorded at T+1. However, for losing a satellite from T to T+1, the path planning system computes the azimuth and elevation of the lost satellite (and machine position) using satellite data recorded at T. Note that through the computations of the azimuth and elevation of the tracked satellites, and the coordinate position (e.g., latitude, longitude, and altitude) of the machine 12, the path planning system determines a size and location of the obstruction (e.g., using the cutoff angle of reception of the signals and triangulation), resulting in the data points 24 and 26, or generally, the obstruction map 22, shown in FIG. 2. For instance, given the dynamic nature of satellite movement and depth perception issues, there may be uncertainty (e.g., based on a single cutoff angle) as to the distance between the obstruction 18 and the machine 12. However, with additional data points (e.g., through more passes), an embodiment of the path planning system may triangulate the obstruction 18 as being located, for instance, at a field boundary. Note that in some embodiments, the computations for the azimuth and elevation when there is detected signal loss may be a projected value based on almanac (orbit) data received by the satellites, or in some embodiments, a computed value based on satellite data recorded before and after the occlusion (e.g., an average).

Figure 3:
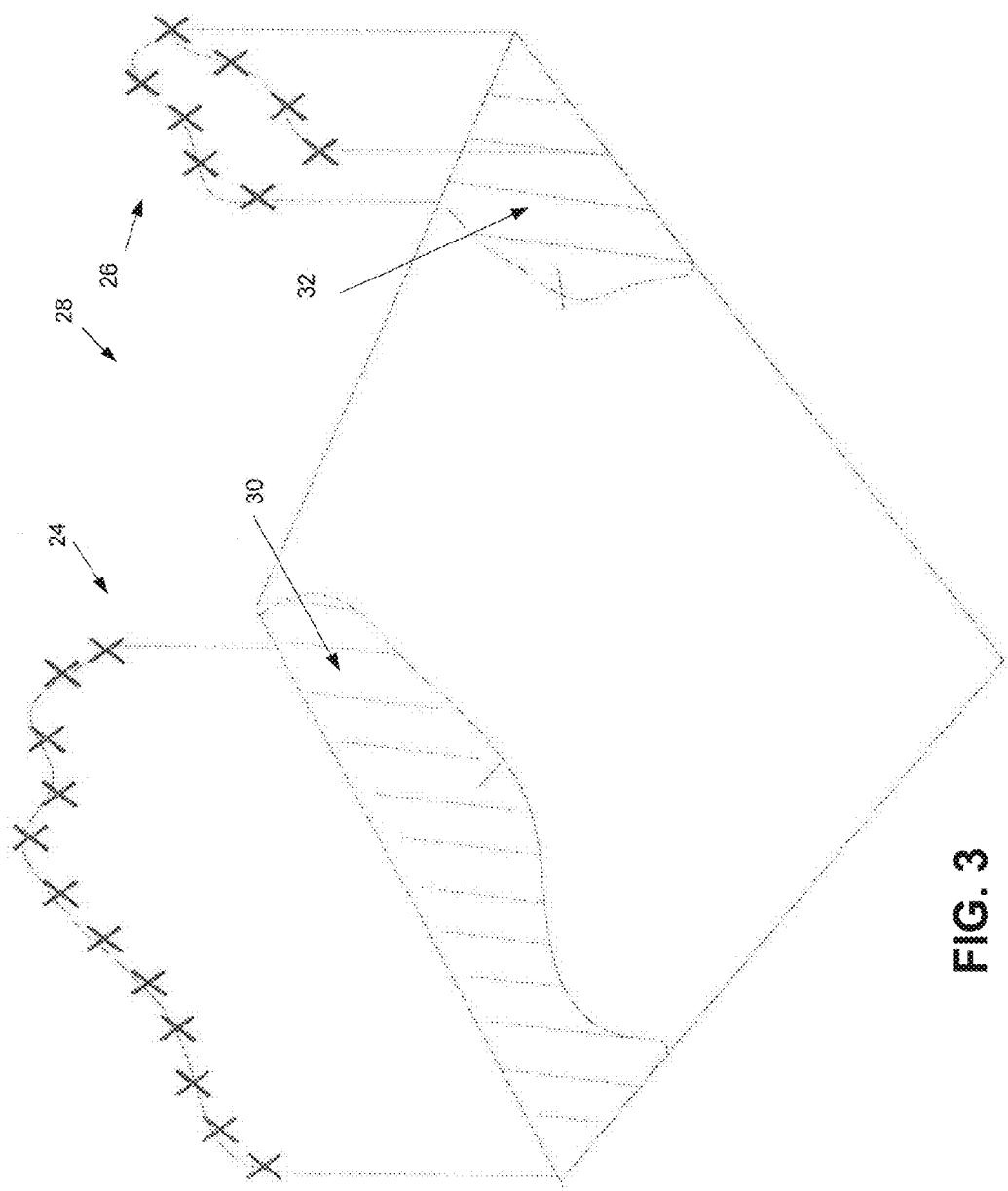
FIG. 3 is a schematic diagram that illustrates an example accuracy map that provides an indication of anticipation of positions with insufficient precision by an embodiment of an example path planning system based on the map of FIG. 2.

FIG. 3 is a schematic diagram that illustrates an accuracy map 28 that enables anticipation of positions with insufficient precision by an embodiment of an example path planning system based on the obstruction map 22 of FIG. 2. For instance, using Dilution of Precision (DOP) computations, including Geometric DOP (GDOP) and Horizontal DOP (HDOP), the path planning system determines areas 30 and 32, corresponding to data points 24 and 26, respectively, where there is likely to be loss of satellite data, likely resulting in an imprecise position determination. As is known, each DOP computation results in a value that represents the goodness of the distribution of satellites across the sky. For instance, if all satellites were clumped in one part of the sky, a poor DOP value (high value) results. Likewise, for a good distribution of satellites, a good DOP value (low value) results. The path planning system uses satellite data (e.g., Almanac or generally, orbital data) to predict where the satellites are at any given time, and based on the obstruction map 22, the satellites that are occluded at given points and times in the field are removed from the DOP computations. In one embodiment, the path planning system determines the DOP in this manner for the entire field, and those areas of high DOP (e.g., 30 and 32, where the satellites are occluded) are identified as areas of anticipated poor precision and/or accuracy as shown in the map 28 of FIG. 3.

Note that in some embodiments, the maps 22 and 28 may be generated remotely from the machine 12. For instance, the recorded data may be communicated (e.g., via on-board telemetry equipment, manually via transfer through a portable storage device, or communicated from an operator's GNSS-hosted smart phone, etc.) to another computing device to generate the maps 22 and/or 28 at a location external to the machine 12. In some embodiments, the recorded data may be uploaded to a portable computing device residing within a cab of the machine 12, and then used later (e.g., offline) to determine waylines.

Figure 4:
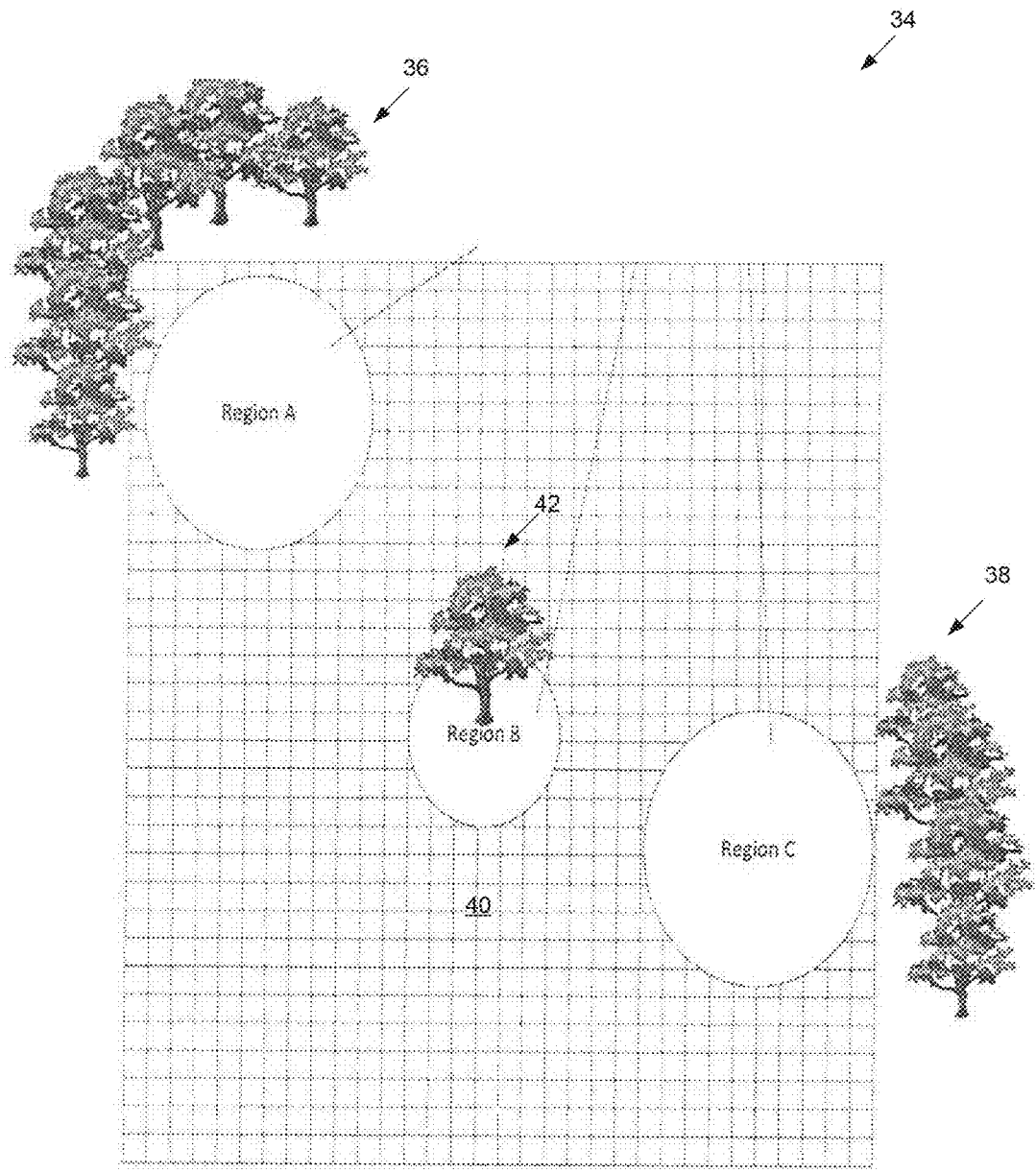
FIGS. 4-7 are schematic diagrams that each conceptually depicts a hybrid diagram of an example environment and the manner in which certain embodiments of a path planning system logically map the environment to assess the positional accuracy of areas or regions of the mapped area over a projected time as a satellite constellation changes.

Referring to FIGS. 4-7, shown are schematic diagrams each conceptually depicting a hybrid diagram comprising an example environment and the manner in which certain embodiments of a path planning system logically map the environment to assess the positional accuracy of areas or regions of the mapped area over a projected time as the satellite constellation changes (as projected based on satellite data corresponding to the orbits of the satellites, such as almanac data). Referring now to FIG. 4, an example environment 34 is shown with plural obstructions 36 and 38 situated proximal to the border of a field 40, and an in-field obstruction 42 located within the field 40. In this example, the obstructions 36, 38, and 42 are trees, though not limited to these types of obstructions and/or quantity or arrangement of obstructions. Also shown are areas or regions A, B, C (shown for simplicity and for illustrative representation as circular, though as will be described below, may practically be more polygonal and irregular in shape), which indicate areas of compromised positional accuracies due to the occlusion of line of sight satellite signal reception as determined based on the information recorded and mapped by the path planning system, as described previously.

Figure 5:
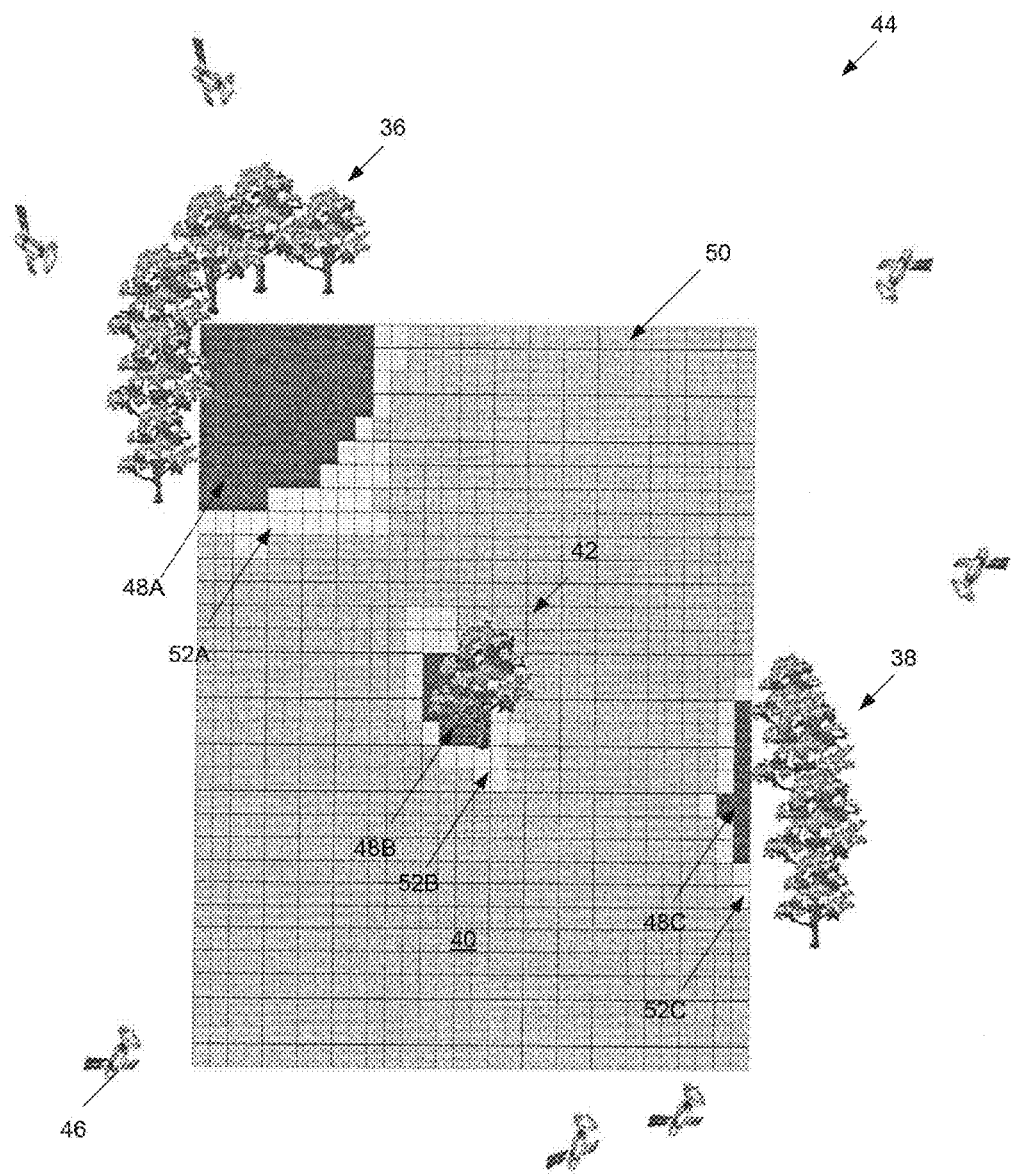

In FIG. 5, the environment of 34 of FIG. 4 is shown as a diagram 44 that visually represents the obstructions 36, 38, and 42 located in or proximal to the field 40 and a first satellite geometry using satellites 46 (e.g., seven (7) shown, though other quantities may be used in some embodiments) at time equals T, where T is an instance of time where accuracy throughout the field 40 is determined. That is, the path planning system calculates the potential accuracy throughout the field 40 at various time projections and projected satellite geometries at those time projections. In this example, the distinction in anticipated accuracies is visually represented in FIG. 4 (and FIGS. 5-7) with differences in shading revealing three different areas of accuracy. For instance, areas 48 (e.g., 48A, 48B, and 48C), represented by the darkest shading, comprise an accuracy or represent a range of accuracies that are the lowest accuracy of the three different areas. Areas 50, represented with a shade that falls between the lightest and darkest areas, comprise an area of best accuracy or range of accuracies. Areas 52 (e.g., 52A, 52B, and 52C), represented with the lightest shading, comprise a transition area of an accuracy or range of accuracies that fall between the best and worst accuracy areas. Note that, although these area distinctions are quantified by absolute accuracies (e.g., single or range of accuracies), in some embodiments, a relative accuracy may be used.

As expected, the areas 48 reveal the worst anticipated accuracies due to occlusions in satellite signal reception from the obstructions 36, 38, and 42 at a given time. The transition areas 52 provide a buffer between the best accuracy areas 50 and the least accuracy areas 48, though in some embodiments, fewer (e.g., no transitions) or more defined transition areas may be determined. As explained above, the accuracies may be determined based on the obstruction map and dilution of precision (DOP) calculations, though other or additional measures of accuracy may be used in some embodiments.

Figure 6:
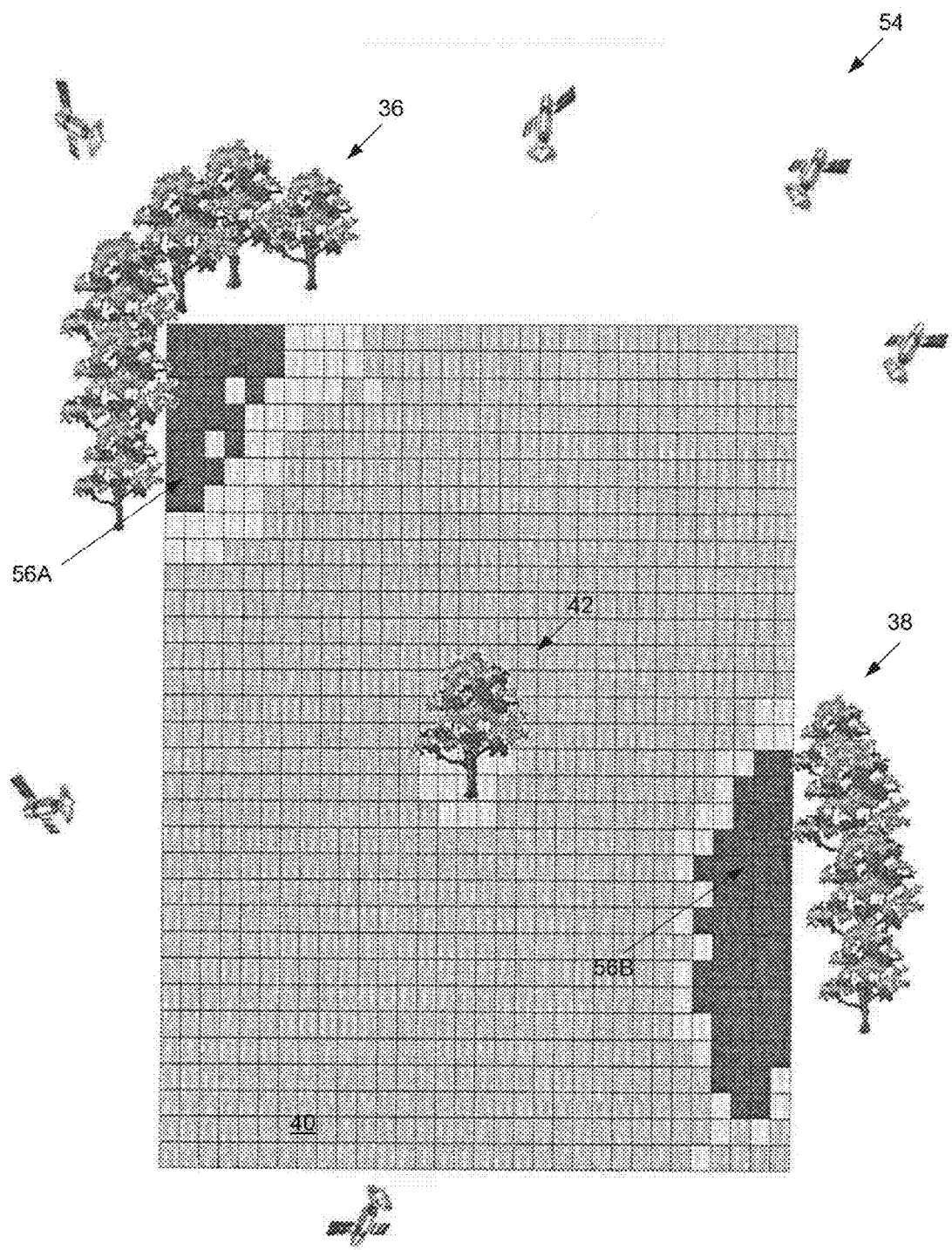

Referring now to FIG. 6, shown is a similar diagram 54 (i.e., similar to FIG. 4) but at projected time equals T+1 based on a subsequent satellite geometry. Given the change in satellite geometry, the nature (e.g., angle of) of occlusion of the line of sight satellite signals received by a GNSS receiver of (or associated with) a machine changes. For instance, the areas of least accuracy due to the obstructions 36, 38, and 42 in or proximal to the field 40 are areas 56 (e.g., 56A and 56B). Compared to the snapshot of FIG. 5, the area 56A is smaller than the area 48A based on the satellite geometry expected at time T+1. Likewise, there are changes to areas of occlusion that occur based on the obstructions 38 (a larger, least accurate area 56B versus least accurate area 48C of FIG. 5) and the occlusion due to obstruction 42 (no least accurate area according to a defined least accurate range in FIG. 6, whereas the occlusion presented by the obstruction 42 in FIG. 5 resulted in a least accurate area 48B). Similarly, changes occur to the transitional areas and most accurate areas due to the change in projected time and constellation arrangement.

Figure 7:
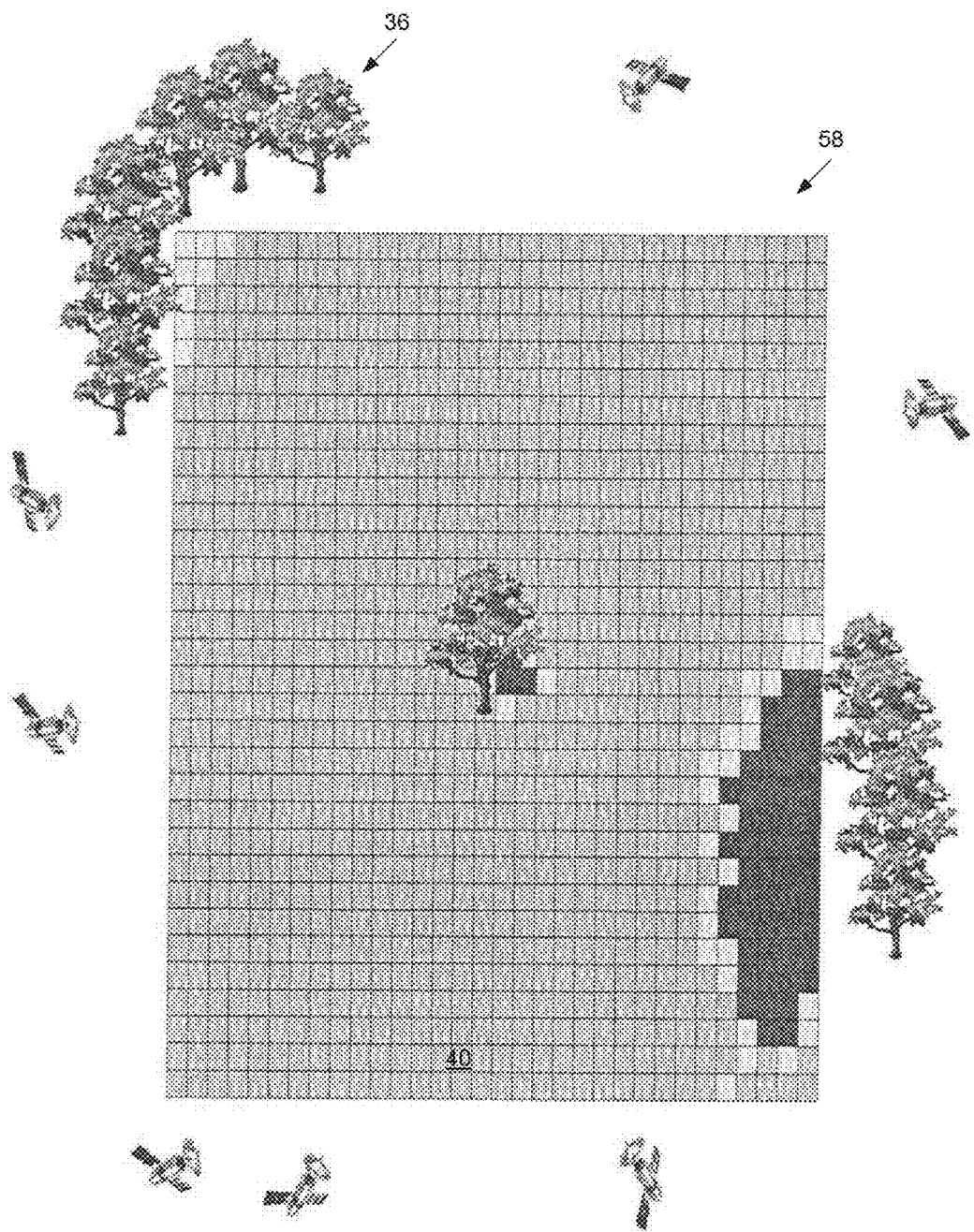

In FIG. 7, shown is a diagram 58 with yet another satellite geometry at projected time equals T+2. In this example, there is no least accurate area (according to a defined range) associated with the occlusion presented by obstruction 36 (unlike the other diagrams 54 and 44 of FIGS. 5 and 4, respectively). Other changes in the accuracies are also calculated to occur for other regions of the field 40, as projected over time equals T+2, as similarly described for FIGS. 5-6, the discussion of which is omitted here for brevity.

Note that in some embodiments, visual representations of all or part of the information provided in diagrams 44 (FIG. 5), 54 (FIG. 6), and 58 (FIG. 7), among other information, may be provided to an operator or other personnel at a computing device (e.g., within the machine 12, FIG. 1) or a computing device external to the machine 12.

Figure 8A:
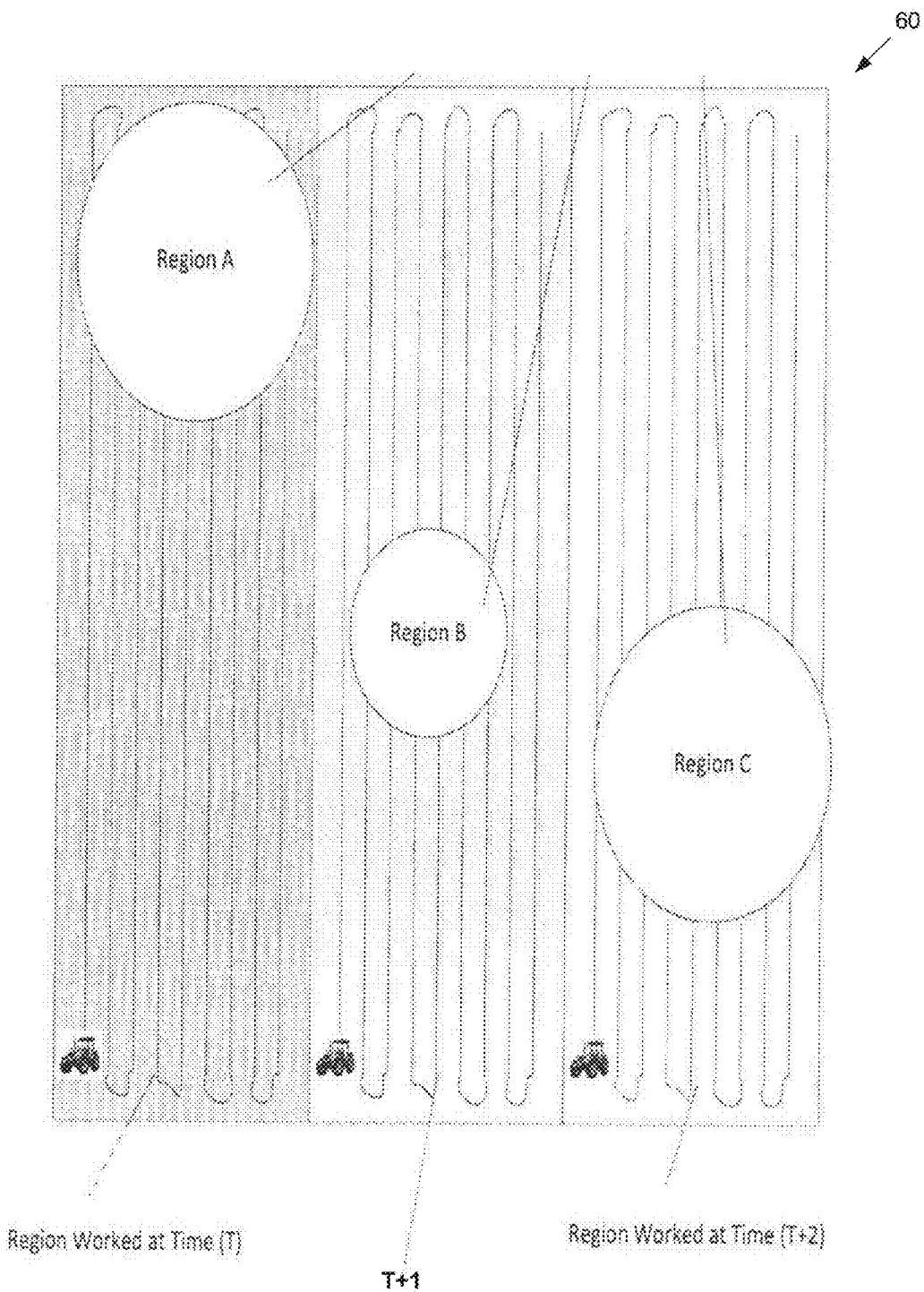
FIG. 8A is a schematic diagram that illustrates previously used waylines for the environment of FIG. 4.
Figure 8B:
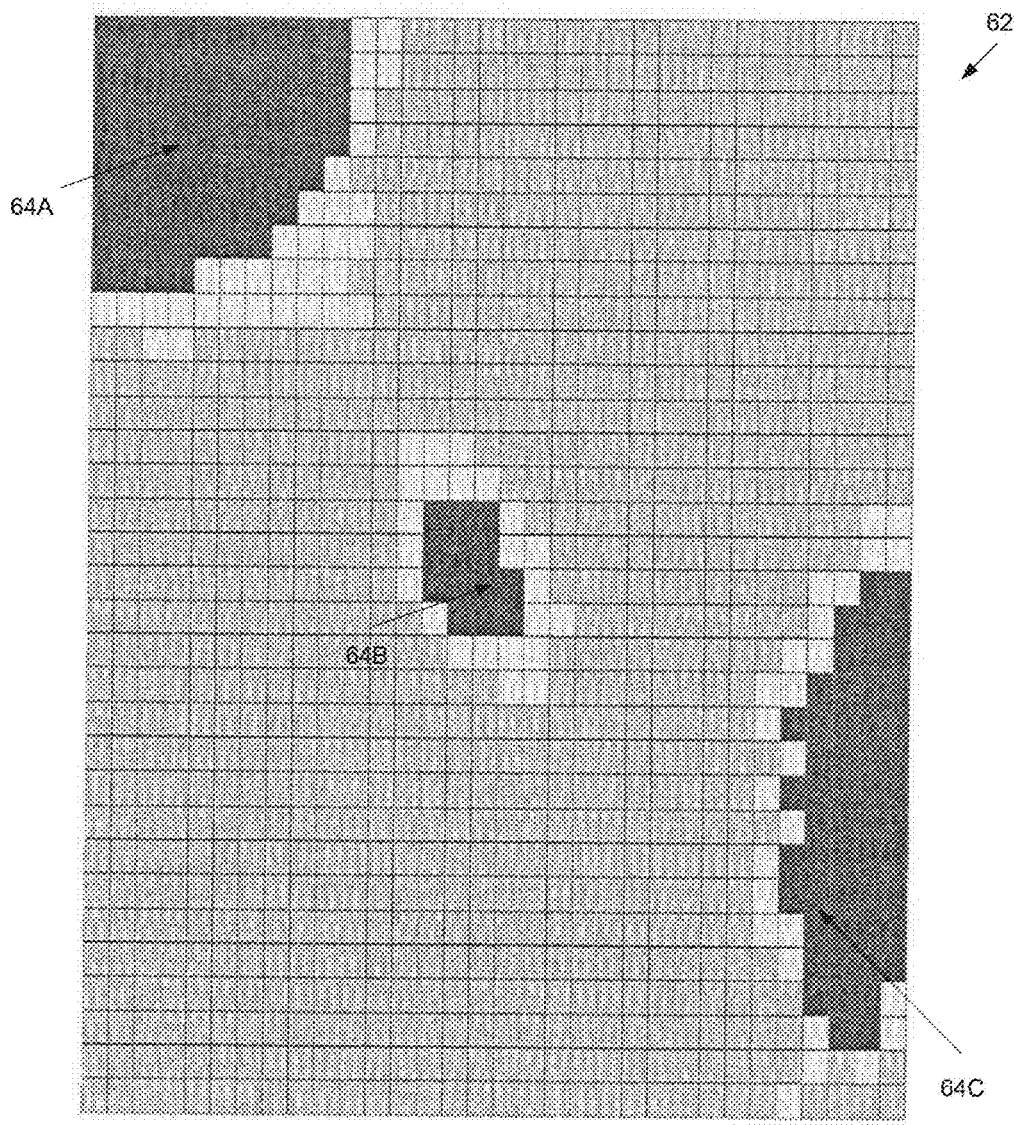
FIG. 8B is a schematic diagram that illustrates a union of accuracies based on traversal according to the waylines shown in FIG. 8A.

Based on the anticipated accuracies over the projected times and satellite geometries, an embodiment of the path planning system may assess when and how to traverse certain regions of the field according to previously used waylines. Attention is directed to FIG. 8A, which is a schematic diagram 60 that illustrates previously used waylines for the environment of FIG. 4. An embodiment of the path planning system identifies waylines associated with regions A, B, and C that are worked at time equals T, T+1, and T+2, respectively, and assesses the accuracies. For instance, based on the anticipated accuracies determined by the path planning system (e.g., FIGS. 5-7), the path planning system determines that it is the worst time to cover region A at time T, at time T+1, it is best to cover region B, and at time equals T+2, it is worst to cover region C. FIG. 8B is a schematic diagram 62 that illustrates a union of anticipated accuracies based on traversal according to the waylines shown in FIG. 8A. In particular, areas of least accuracy 64 (e.g., 64A, 64B, and 64C) are significant. The path planning system may determine the assessments corresponding to FIG. 8A or the union of accuracies shown in FIG. 8B transparently (e.g., as part of the wayline determination process), or in some embodiments, present recommendations and/or options to an operator or other personnel (e.g., enabling operator intervention).

Figure 9A:
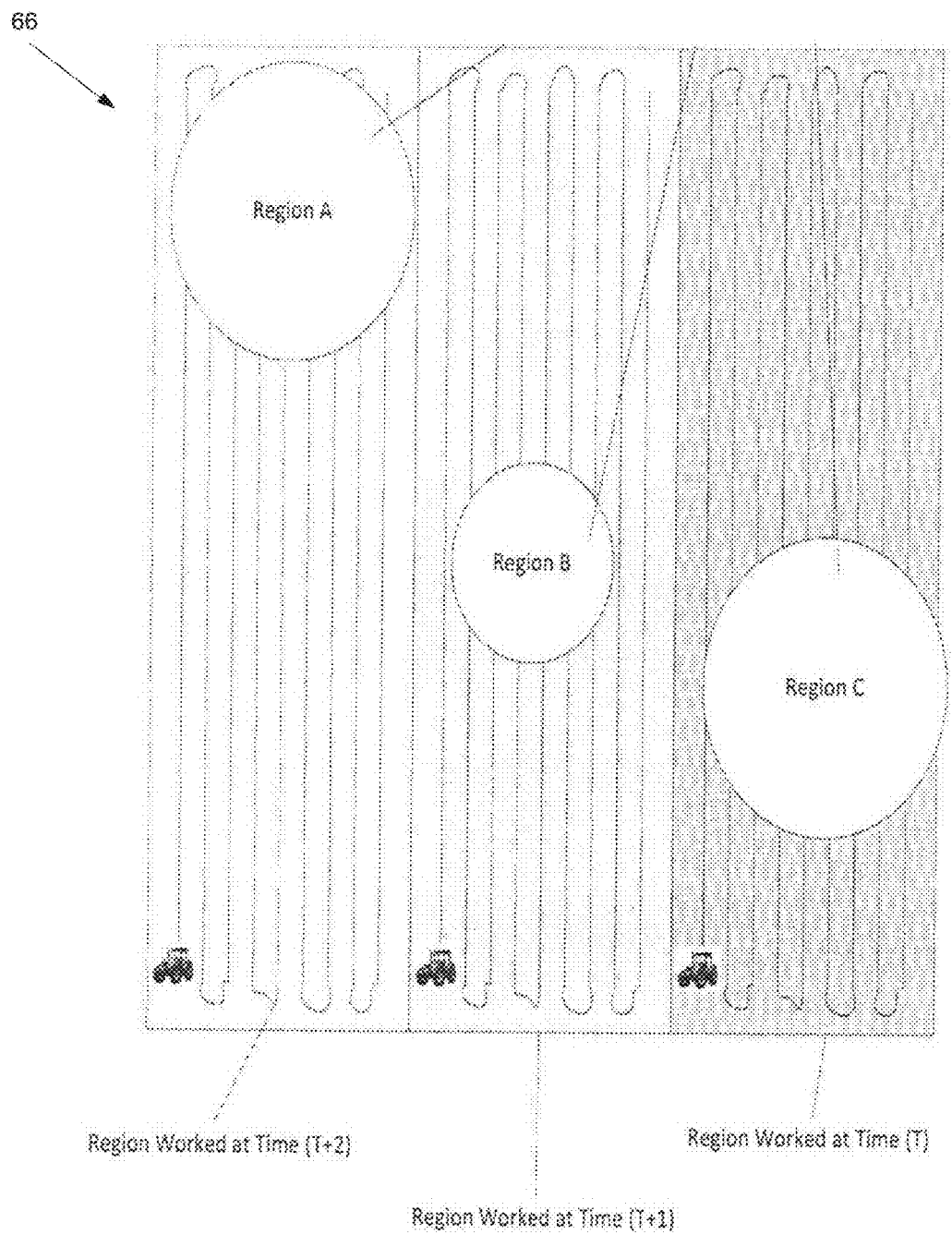
FIG. 9A is a schematic diagram that illustrates waylines determined by an embodiment of an example path planning system for the environment of FIG. 4 based on the maps of FIGS. 5-7.
Figure 9B:
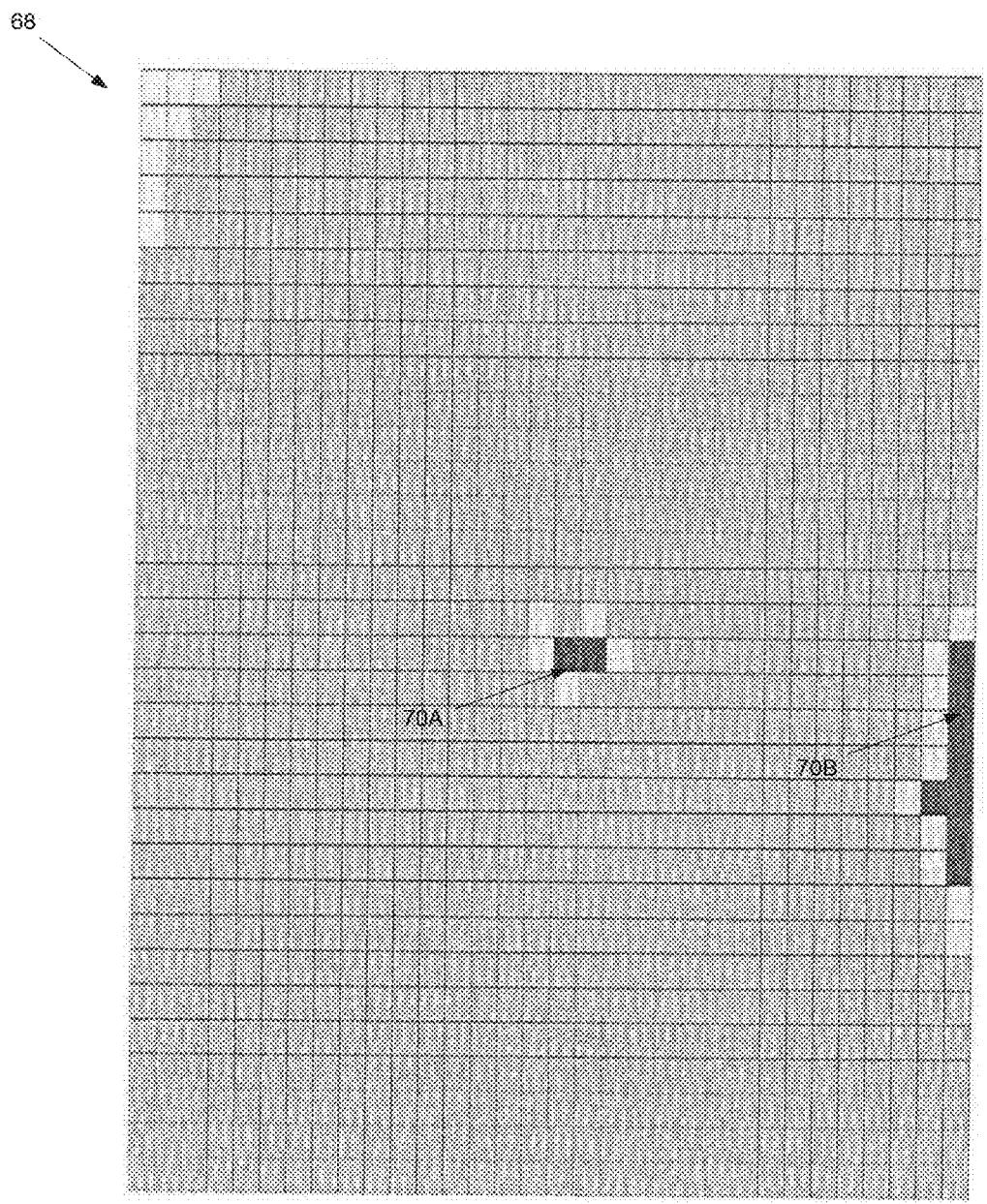
FIG. 9B is a schematic diagram that illustrates a union of accuracies based on traversal according to the waylines shown in FIG. 9A.

FIG. 9A is a schematic diagram 66 that illustrates waylines determined by an embodiment of an example path planning system for the environment of FIG. 4 based on the maps of FIGS. 5-7. Compared to the diagram 60 of FIG. 8A, the diagram 66 reveals that the path planning system has determined that a more optimized approach to traversing the field at improved accuracies is to traverse region C at time equals T, region B at time equals T+1, and region A at time equals T+2. In effect, by traversing the field in an order that is different than the order of paths previously traversed, accuracy is improved, as shown by the union of accuracies in FIG. 9B using this approach. Notably, the areas of least accuracy 70 (e.g., 70A and 70B) are diminished considerably compared to the areas 64 of FIG. 8A using the non-optimized approach.

Figure 10:
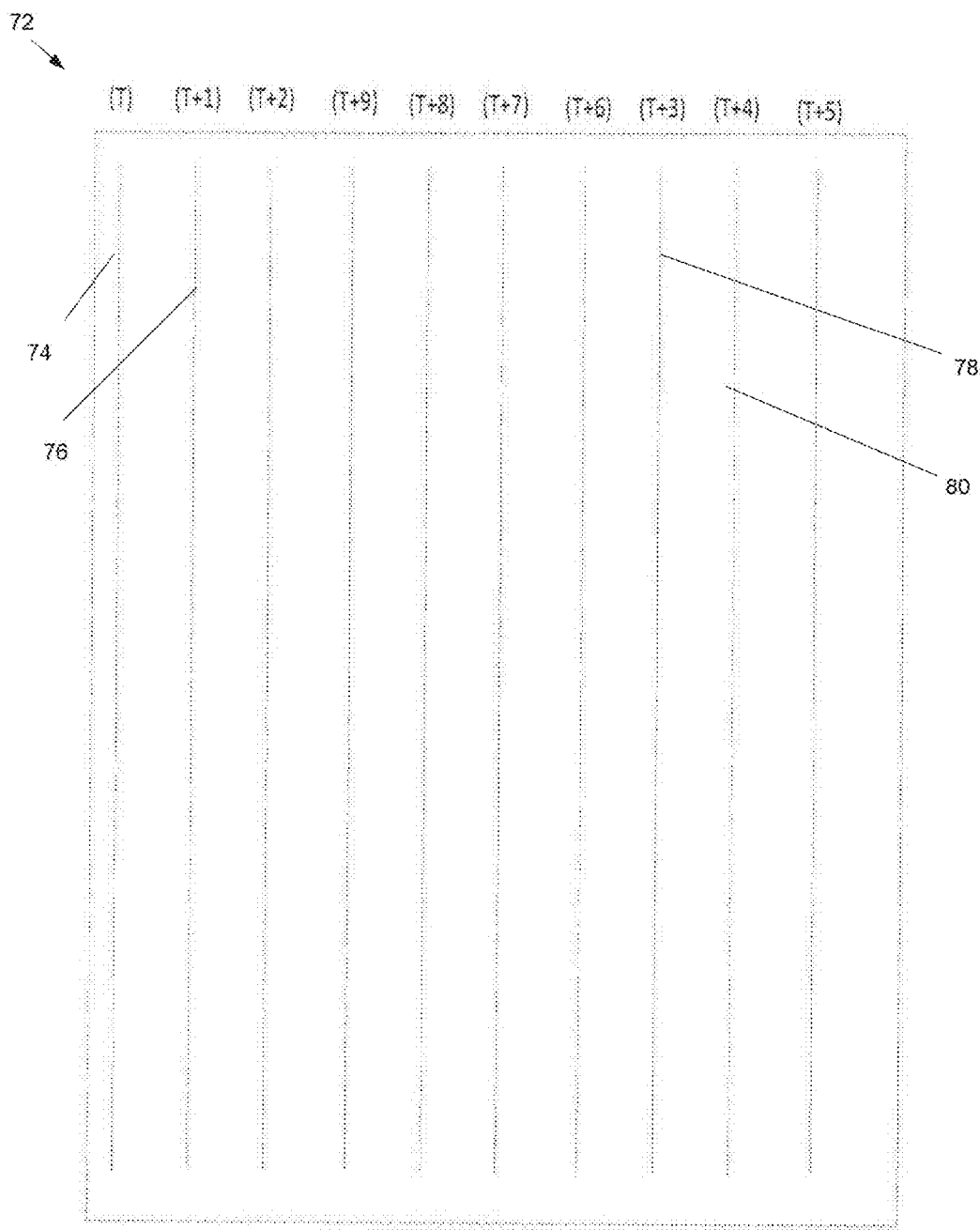
FIG. 10 is a schematic diagram that illustrates waylines determined by an embodiment of an example path planning system that re-order a path traversal sequence of previously used waylines based on accuracy maps.

FIG. 10 is a schematic diagram 72 that illustrates waylines determined by an embodiment of an example path planning system that re-order previously used paths corresponding to waylines based on accuracy maps. As shown, the sequence of wayline path traversal is in the order of path 74 at time equals T, path 76 at time equals T+1, then advancing the machine to path 78 at T+3 (skipping the paths located between path 76 and path 78 for now), traversing path 80 at time equals T+4, and so on. In other words, the standard, sequential and progressive advancement of the machine across a field according to previous waylines is replaced with updated waylines that tailor or modify the sequence or order of path traversal, which reduces or eliminates positional inaccuracies that are based on satellite signal occlusions.

In one example implementation, and using an embodiment where the path planning system implements wayline determinations in real-time, the path planning system uses the satellite data recorded from previous passes of a field to map the obstructions in, of, or around the field. As the machine enters the field, the operator may load the waylines for the field. The path planning system calculates (for the entire field, though calculations may be done progressively at interrupted blocks of times based on the area or amount of time traveled for defined segments of the entire field in some embodiments) the potential accuracy at each point and projects these determined accuracies through time as the satellite geometries change. The path planning system then recommends an order in which the machine should traverse the paths to ensure that each region has the best accuracy. Note that if there is an interruption in path traversal (e.g., the machine breaks down or interruptions for other reasons), upon resumption of field traversal, the path planning system updates the waylines according to the time and constellations that are projected from the restarting time.

Figure 11:
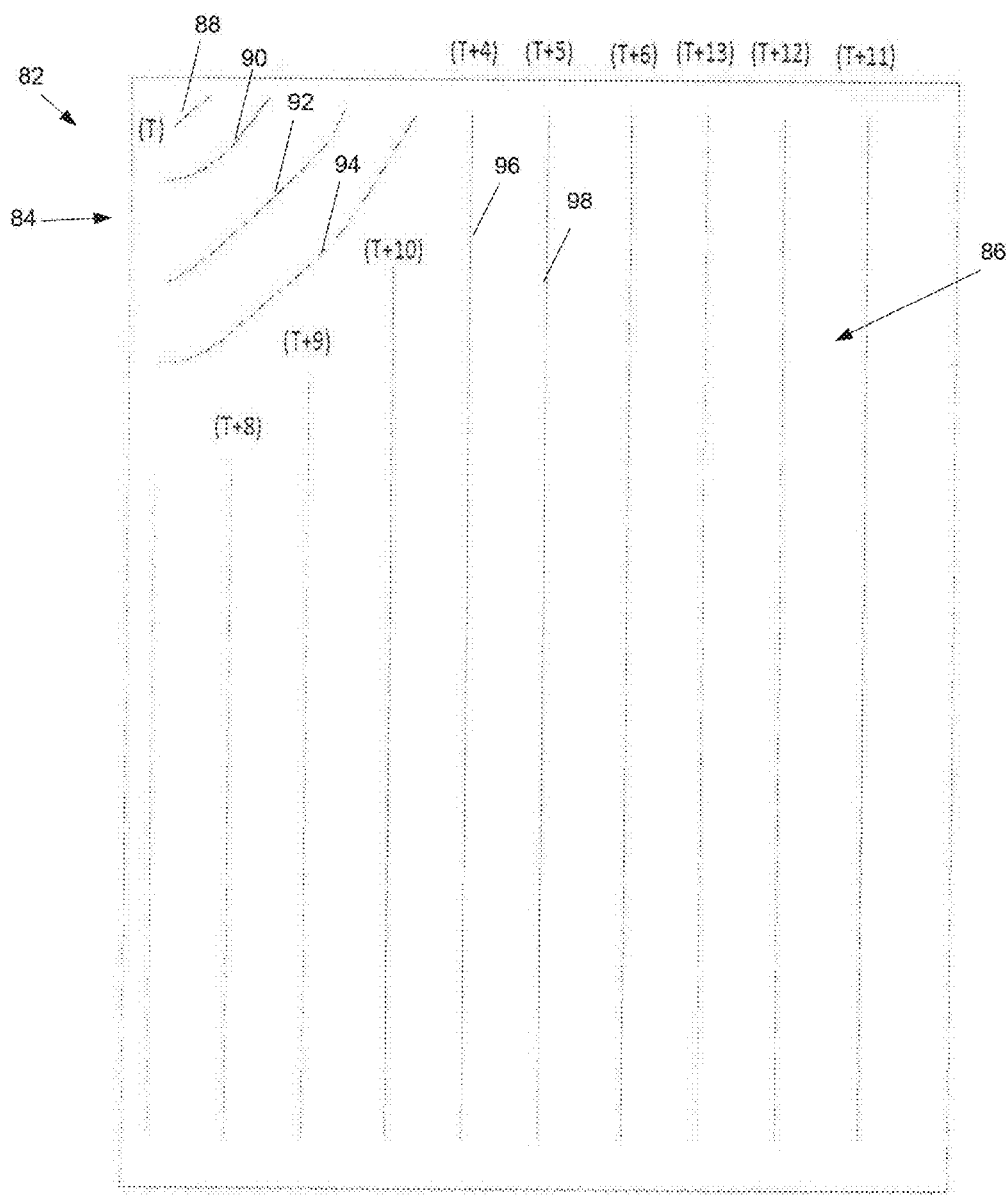
FIG. 11 is a schematic diagram that illustrates new waylines of different wayline types as determined by an embodiment of an example path planning system based on accuracy maps.

In some embodiments, as indicated above, the path planning system may define new waylines based on the anticipated accuracy determinations. Referring now to FIG. 11, shown is a schematic diagram 82 that illustrates new waylines of different wayline types or shapes as determined by an embodiment of an example path planning system based on accuracy maps. In this example, the path planning system has assessed the accuracy in similar manner to that described above for determining a revised order of path traversal, and then defines new waylines arranged according to a contour type 84 and straight A-B lines 86. It should be appreciated by one having ordinary skill in the art that the arrangement shown in FIG. 11 is merely illustrative, and that other arrangements and/or types may be used and hence are contemplated to be within the scope of the disclosure. In this example, the path planning system recommends traversal of paths 88, 90, 92, and 94 at respective times T, T+1, T+2, and T+3 of the contour wayline type, and then advancing to path 96 for T+4, path 98 for T+6, and so on.

In one example implementation, and again, using an example embodiment of a path planning system that implements wayline determination in real-time, the path planning system uses the satellite data recorded from previous passes of a field to map the obstructions in, of, or around the field. The path planning system calculates (for the entire field, though calculations may be done progressively at interrupted blocks of times based on the area or amount of time traveled for defined segments of the entire field in some embodiments) the potential accuracy at each point and projects these determined accuracies through time as the satellite geometries change (e.g., as the constellation changes). The path planning system then designs new waylines for the operator (e.g., selecting type, such as straight, contour, and laying out their position and orientation) that optimizes position accuracy. In some embodiments, the path planning system may further recommend an order in which the machine should traverse the paths to ensure that each region has the best accuracy.

Figure 12A:
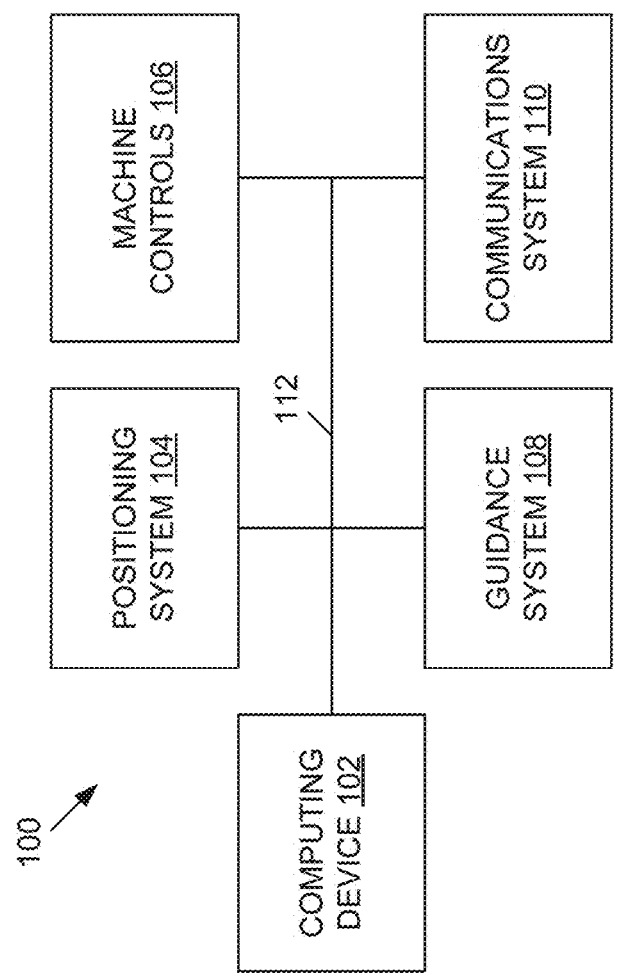
FIG. 12A is a block diagram that illustrates an embodiment of an example path planning system.

Attention is now directed to FIG. 12A, which illustrates an embodiment of an example path planning system 100. It should be appreciated within the context of the present disclosure that some embodiments may include additional components or fewer or different components, and that the example depicted in FIG. 12A is merely illustrative of one embodiment among others. The path planning system 100 may reside entirely in the machine (e.g., machine 12, FIG. 1), or in some embodiments, functionality of the path planning system 100 may be distributed among plural devices or systems (e.g., within the machine and external to the machine). In some embodiments, functionality of the path planning system 100 may reside in a single device, such as a local or remote computing device. In one embodiment, the path planning system 100 comprises one or more computing devices, such as computing device 102. In one embodiment, the computing device 102 may reside in the machine 12 and comprises an electronic control unit (ECU). The computing device 102 is coupled to a positioning system 104, machine controls 106, a guidance system 108, and a communications system 110, all coupled to each other via a network 112. It should be appreciated by one having ordinary skill in the art, in the context of the present disclosure, that functionality for the various depicted components may be combined in a single device (e.g., single ECU), or further distributed among additional components locally or among disparate locations. The network 112 may be embodied as a controller area network (CAN), such as in conformance to ISO 11898, ISO 11783, etc.), though in some embodiments, other protocols and/or standards (e.g., RS 232) may be used.

In one embodiment, the computing device 102 comprises a computer architecture, including a processor, memory, and input/output interfaces, including a user interface such as one or a combination of a display terminal or screen, keyboard and/or other devices, such as a mouse, stylus, microphone, joystick, among others user-interface components well-known to one having ordinary skill in the art. The computing device 102 enables an operator to centrally access the various functionality of the machine 12 (FIG. 1), such as auto-steer functionality of the guidance system 108 and the GNSS receiver functionality of the positioning system 104. In some embodiments, user interface functionality may be provided with each ECU and/or component.

The positioning system 104 comprises a GNSS receiver, and is configured to access one or more constellations of satellites to receive satellite data and process the data to determine the coordinate position of the machine 12 (FIG. 1) and/or coordinate position of the GNSS receiver and the azimuth and elevation information of the satellites. The satellite data may include clocking and/or phase information, and an almanac, as is known in the art. The positioning system 104 triangulates its position (and/or the position of the machine 12), enabling the determination of size and location of the obstructions in, of, and/or around a field.

The machine controls 106 collectively comprise the various actuators, sensors, and/or subsystems residing on the machine 12 (FIG. 1), including those used to control machine navigation (e.g., speed, direction (such as a steering system), etc.), implement (e.g., header or trailer) position, and/or control of internal processes, among others.

The guidance system 108 comprises the various components that enable semi-autonomous or autonomous traversal of a field by the machine 12 (FIG. 1), including gyroscopes, accelerometers, among other sensors. The guidance system 108 further comprises guidance software/firmware (e.g., in the computing device 102 or in the guidance system 108), and cooperates with the machine controls 106, and the positioning system 104 to provide, for instance, auto-steer functionality.

The communications system 110 enables wireless (and/or wired) communication with other devices or systems, such as remote connection to external networks or devices. In one embodiment, the communications system 110 comprises a radio frequency (RF) modem and cellular modem to enable wireless fidelity (W-Fi) and cellular communications, respectively. For instance, the information recorded by the path planning system 100, such as a map of obstructions or accuracy maps, may be communicated via the cellular modem of the communications system 110 to a remote server or other computing device for further processing, such as for the determination of waylines (whether according to a re-ordering of path traversal sequence or design of new waylines).

The computing device 102 is configured to receive and process information from the positioning system 104, machine controls 106, guidance system 108, and communications system 110. For instance, the computing device 102 may receive input from a user interface, such as to enable intervention of machine operation by the operator, to provide feedback of a change in speed or direction and/or or an impending change or need or recommendation for change or wayline path ordering or selection of wayline types, or to commence and ultimately engage auto-steer. In some embodiments, the computing device 102 may present the map of obstructions, as well as maps of anticipated accuracies. Such maps may include an indication of regions where occlusion of satellite signals is anticipated, as well as recommended waylines (e.g., ordering and/or types). In some embodiments, the computing device 102 may receive input from the machine controls 106 (e.g., such as to enable feedback as to the position or status of certain devices, such as a header height and/or width, and/or speed, direction of the machine 12 of FIG. 1, etc.). The computing device 102 may further be configured with software and/or firmware that are used in conjunction with the various components, such as guidance software to be used with the guidance system 108, machine controls 106, and the positioning system 104, and path planning software to be used in conjunction with the positioning system 104 and/or the guidance system 108. The computing device 102 is also configured to cause the access of data from a data structure via the communications system 110 to forward satellite data (e.g., an almanac) and/or other information (e.g., coordinate position, azimuth, elevation, etc. that may be computed based on the satellite data) to a remote terminal and to enable computation (e.g., offline or real-time) of obstruction and/or accuracy maps and ultimately recommended waylines. In other words, one or more of the functionality of the path planning system 100 may be performed remotely to benefit from increased processing power and/or remote control or management of machine operations. Note that in some embodiments, one or more of the functionality of the computing device 102 may be integrated in one of the other components, such as in the positioning system 104 or the guidance system 108 (or a combination of components).

Figure 12B:
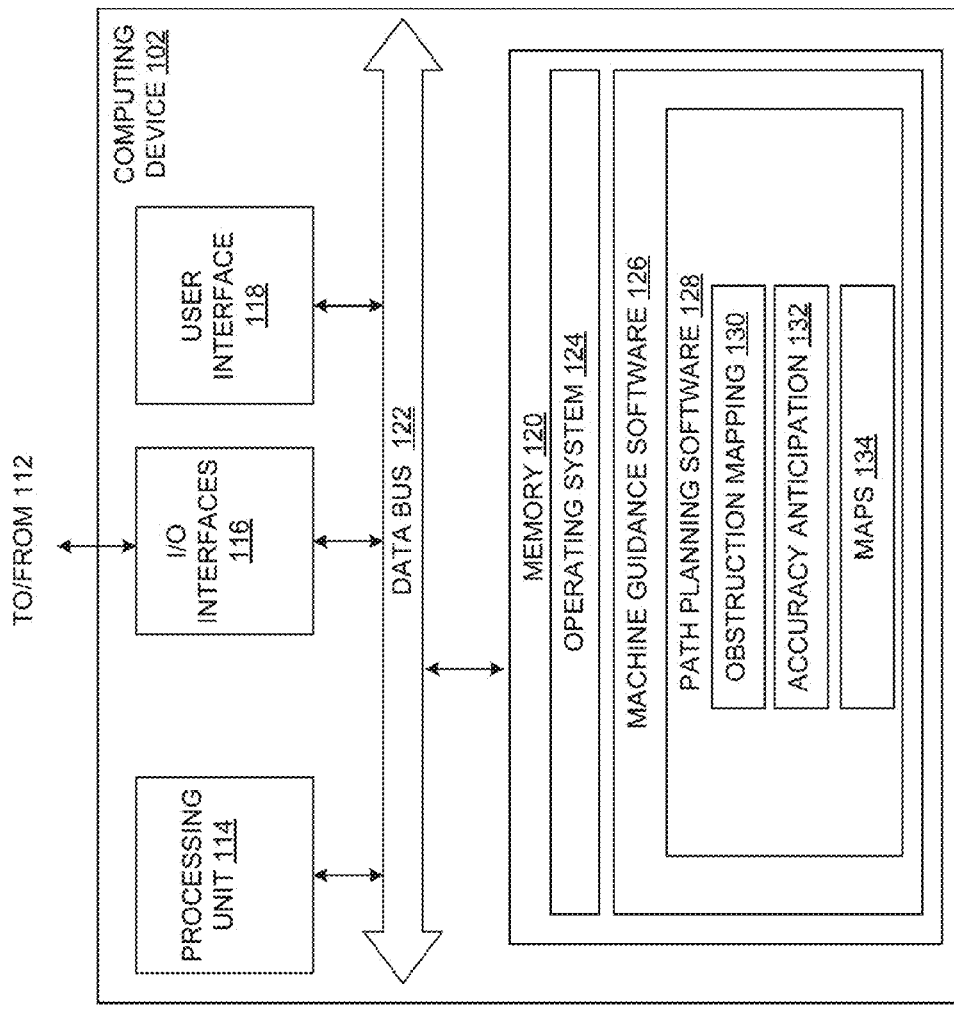
FIG. 12B is a block diagram that illustrates an embodiment of an example computing device for the example path planning system of FIG. 12A.

FIG. 12B further illustrates an example embodiment of the computing device 102. One having ordinary skill in the art should appreciate in the context of the present disclosure that the example computing device 102 is merely illustrative, and that some embodiments of computing devices may comprise fewer or additional components, and/or some of the functionality associated with the various components depicted in FIG. 12B may be combined, or further distributed among additional or other components shown in FIG. 12A in some embodiments. It should be appreciated that, though described in the context of residing in a machine 12 (FIG. 1), in some embodiments, as indicated above, one or more of the following functionality may be performed remote from (e.g., external to) the machine 12 or without the machine 12 in some embodiments. Referring to FIG. 12B, with continued reference to FIG. 12A, the computing device 102 is depicted in this example as a computer system, but may be embodied as a programmable logic controller (PLC), FPGA, ASIC, among other devices. It should be appreciated that certain well-known components of computer systems are omitted here to avoid obfuscating relevant features of the computing device 102. In one embodiment, the computing device 102 comprises one or more processing units, such as processing unit 114, input/output (I/O) interface(s) 116, user interface 118, and memory 120, all coupled to one or more data busses, such as data bus 122. Note that in some embodiments, the user interface 118 may be a separate component accessed over the network 112 via the I/O interfaces 116. The memory 120 may include any one or a combination of volatile memory elements (e.g., random-access memory RAM, such as DRAM, and SRAM, etc.) and nonvolatile memory elements (e.g., ROM, hard drive, tape, CDROM, etc.). The memory 120 may store a native operating system, one or more native applications, emulation systems, or emulated applications for any of a variety of operating systems and/or emulated hardware platforms, emulated operating systems, etc. In some embodiments, the memory 120 may store one or more field maps that were recorded from a prior traversal of a given field, waylines (e.g., previously used), accuracy maps, satellite data, etc. In the embodiment depicted in FIG. 12B, the memory 120 comprises an operating system 124, machine guidance software 126, path planning software 128, which may include (though in some embodiments, may be segregated modules) obstruction mapping software 130, accuracy anticipation software 132, and maps 134 (e.g., obstruction maps, accuracy maps, etc.). The path planning software 128 may be part of the guidance software 126, or a separate module that feeds data to the guidance software. The path planning software 128 uses information from the maps 134 to determine waylines. For instance, the obstruction mapping software 130 generates obstruction maps (e.g., three-dimensional obstruction maps) of obstructions for a field based on the satellite data and well-known triangulation computations (e.g., based on cutoff angles). The GNSS receiver of the positioning system 104 receives satellite data and computes the (machine) coordinate position and the azimuth and elevation of the satellites. The path planning software 128 uses the maps 134 (e.g., obstruction maps) or, in some embodiments, forwards to the accuracy anticipation software 132. The accuracy anticipation software 132 receives almanac data and determines the anticipated accuracy in positioning across the field (e.g., at plural projected times based on plural satellite geometries) based on the obstruction maps and stores the accuracy maps in maps 134 or, in some embodiments, forwards to the wayline generation component of the machine guidance software 126. In some embodiments, the accuracy maps may be used at a remote computing device (e.g., communicated via telemetry, transferred via a portable memory component, etc.) for remote wayline determinations that are based on the accuracy maps. In one embodiment, the accuracy anticipation software 132 computes the accuracy throughout the field using geometric and/or horizontal DOP calculations, though some embodiments may use other measures to assess the anticipated positional accuracy. The wayline generation component of the machine guidance software 126 uses the accuracy maps to determine (e.g., without operator intervention) waylines to be traversed (e.g., new design, or re-ordered paths). In some embodiments, the machine guidance software 126 may present to an operator (e.g., within the machine 12 or external to the machine) recommended waylines that the operator chooses from, thus enabling operator intervention. The maps 134 may comprise one or more data structures corresponding to the information in FIGS. 1-7, such as obstruction maps and accuracy maps. It should be appreciated that in some embodiments, additional or fewer software modules (e.g., combined functionality) may be employed in the memory 120 or additional memory, or the arrangement of modules may be different. In some embodiments, a separate storage device may be coupled to the data bus 122 (or network 112, FIG. 12A), such as a persistent memory (e.g., optical, magnetic, and/or semiconductor memory and associated drives).

The machine guidance software 126 further enables autonomous or semi-autonomous travel by the machine 12 (FIG. 1) based on the waylines and further based on the continually updated positioning data provided by the positioning system 104 (e.g., FIG. 12A, accessed via I/O interfaces 116).

Execution of the application software modules 126-132 may be implemented by the processing unit 114 under the management and/or control of the operating system 124. In some embodiments, the operating system 124 may be omitted and a more rudimentary manner of control implemented. The processing unit 114 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the computing device 102.

The I/O interfaces 116 provide one or more interfaces to the network 112 (FIG. 12A) and other networks. In other words, the I/O interfaces 116 may comprise any number of interfaces for the input and output of signals (e.g., analog or digital data) for conveyance over the network 112. The input may comprise input by an operator (local or remote) through the user interface 118 (e.g., a keyboard, joystick, steering wheel, touch-display, or mouse or other input device (or audible input in some embodiments)), and input from signals carrying information from one or more of the components of the path planning system 100 (FIG. 12A).

When certain embodiments of the computing device 102 are implemented at least in part as software (including firmware), as depicted in FIG. 12B, it should be noted that the software can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiment of the computing device 102 are implemented at least in part as hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 13:
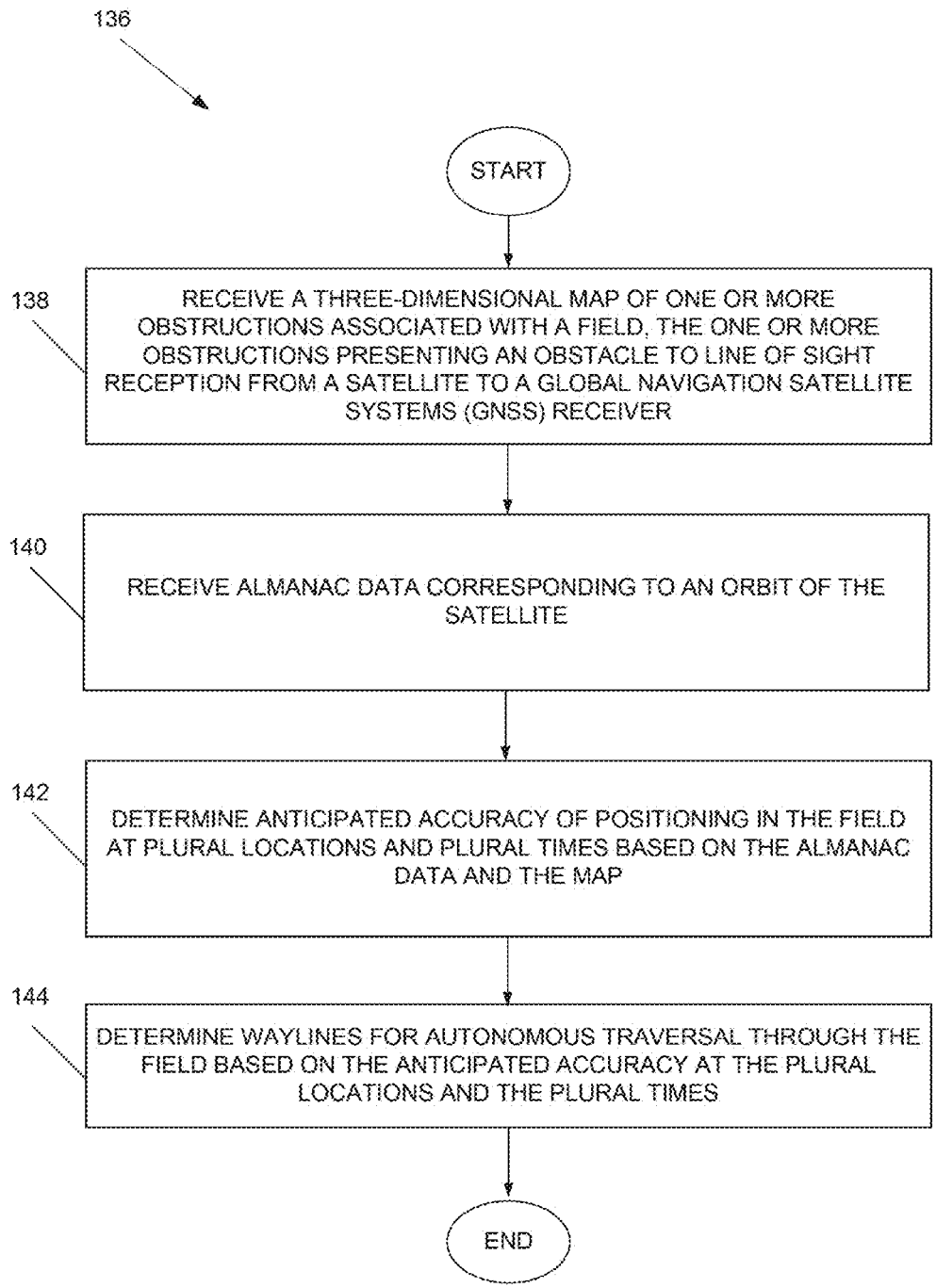
FIG. 13 is a flow diagram that illustrates an embodiment of an example path planning method.

Having described certain embodiments of a path planning system 100, it should be appreciated within the context of the present disclosure that one embodiment of a path planning method, denoted as method 136 as illustrated in FIG. 13, comprises receiving a three dimensional map of one or more obstructions associated with a field, the one or more obstructions presenting an obstacle to line of sight reception from a satellite to a global navigation satellite systems (GNSS) receiver (138); receiving almanac data corresponding to an orbit of the satellite (140); determining anticipated accuracy of positioning in the field at plural locations and plural times based on the almanac data and the map (142); and determining waylines for autonomous traversal through the field based on the anticipated accuracy at the plural locations and the plural times (144).

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

At least the following is claimed:

1. A method, comprising:
   receiving a three-dimensional map of one or more obstructions associated with a field, the one or more obstructions presenting an obstacle to line of sight reception from a satellite to a global navigation satellite systems (GNSS) receiver;
   receiving almanac data corresponding to an orbit of the satellite;
   determining anticipated accuracy of GNSS positioning in the field at plural locations and plural times based on the almanac data and the map;
   determining waylines for autonomous traversal through the field based on the anticipated accuracy at the plural locations and the plural times; and
   determining a plan for traversing the waylines to optimize the accuracy of GNSS positioning, the plan involving traversing waylines in a first region at a first time and traversing waylines in a second region at a second time such that GNSS positioning accuracy is better in the first region at the first time and better in the second region at the second time.

2. The method of claim 1, wherein determining anticipated accuracy comprises computing a dilution of precision (DOP) for points throughout the field.

3. The method of claim 1, wherein determining waylines for traversal of the field comprises re-ordering a sequence of paths associated with the waylines previously used for the field.

4. The method of claim 1, wherein determining waylines for traversal of the field comprises generating new waylines.

5. The method of claim 4, wherein generating new waylines comprises using plural wayline types.

6. The method of claim 1, wherein the wayline traversal is planned to improve an overall positioning accuracy.

7. The method of claim 1, wherein determining the anticipated accuracy of positioning in the field at the plural locations and the plural times comprises determining the anticipated accuracy at defined projected increments of time for traversal of the entire field.

8. The method of claim 1, further comprising re-determining waylines responsive to an interruption of field traversal that occurs during traversal according to the determined waylines.

9. The method of claim 1, wherein the one or more obstructions comprise one or a combination of in-field obstructions, obstructions along a border, or terrain obstructions.

10. A system, comprising:
a machine comprising a guidance system and a global navigation satellite system (GNSS) receiver, the GNSS receiver configured to receive almanac data corresponding to an orbit of a satellite;
a computing device configured to:
receive a three-dimensional map of one or more obstructions associated with a field, the one or more obstructions presenting an obstacle to line of sight reception from the satellite to the GNSS receiver;
determine anticipated accuracy of GNSS positioning of the machine in the field at plural locations and plural times based on the almanac data and the map;
determine waylines for autonomous traversal through the field based on the anticipated accuracy at the plural locations and the plural times; and
determine a plan for traversing the waylines to optimize the accuracy of GNSS positioning, the plan involving traversing waylines in a first region at a first time and traversing waylines in a second region at a second time such that GNSS positioning accuracy is better in the first region at the first time and better in the second region at the second time.

11. The system of claim 10, wherein the computing device is configured to determine anticipated accuracy by computing a dilution of precision (DOP) for points throughout the field.

12. The system of claim 10, wherein the computing device is configured to determine waylines by re-ordering paths associated with the waylines previously used for traversing the field.

13. The system of claim 10, wherein the computing device is configured to determine waylines by generating new waylines.

14. The system of claim 13, wherein the computing device is configured to generate new waylines using plural wayline types.

15. The system of claim 10, wherein the computing device is configured to determine waylines that improve an overall positioning accuracy.

16. The system of claim 10, wherein the computing device is configured to determine the anticipated accuracy of positioning in the field at the plural locations and the plural times by determining the anticipated accuracy at defined projected increments of time for traversal of the entire field.

17. The system of claim 10, wherein the computing device is configured to re-determine the waylines responsive to an interruption of field traversal that occurs during traversal by the machine according to the determined waylines.

18. A machine, comprising:
a guidance system;
a global navigation satellite system (GNSS) receiver, the GNSS receiver configured to receive almanac data corresponding to an orbit of a satellite; and
a computing device, the computing device configured to:
receive a three-dimensional map of one or more obstructions associated with a field, the one or more obstructions presenting an obstacle to line of sight reception from the satellite to the GNSS receiver;
determine anticipated GNSS accuracy of positioning of the machine in the field at plural locations and plural times based on the almanac data and the map;
determine waylines based on the anticipated accuracy at the plural locations and the plural times;
determine a plan for traversing the waylines to optimize the accuracy of GNSS positioning, the plan involving traversing waylines in a first region at a first time and traversing waylines in a second region at a second time such that GNSS positioning accuracy is better in the first region at the first time and better in the second region at the second time; and
provide the waylines for use in the guidance system.

* * * * *